(12) United States Patent
Jokschas et al.

(10) Patent No.: US 10,662,834 B2
(45) Date of Patent: May 26, 2020

(54) FILTER FOR FILTERING LIQUIDS AND FILTER ELEMENT OF SUCH A FILTER

(71) Applicant: MANN+HUMMEL GmbH, Ludwigsburg (DE)

(72) Inventors: Guenter Jokschas, Murrhardt (DE); Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/164,251

(22) Filed: Oct. 18, 2018

(65) Prior Publication Data

US 2019/0145294 A1    May 16, 2019

Related U.S. Application Data

(63) Continuation of application No. 14/736,863, which is a continuation of application No. PCT/EP2013/071576, filed on Oct. 16, 2013, now abandoned.

(30) Foreign Application Priority Data

Dec. 13, 2012   (DE) .................. 10 2012 024 349

(51) Int. Cl.
```
F01M 11/03      (2006.01)
B01D 35/00      (2006.01)
B01D 36/00      (2006.01)
B01D 29/21      (2006.01)
```
(52) U.S. Cl.
CPC ............. *F01M 11/03* (2013.01); *B01D 29/21* (2013.01); *B01D 35/005* (2013.01); *B01D 36/003* (2013.01); *B01D 2201/0415* (2013.01); *B01D 2201/291* (2013.01); *B01D 2201/305* (2013.01); *B01D 2201/316* (2013.01)

(58) Field of Classification Search
CPC .... B01D 35/005; B01D 36/003; B01D 29/21; B01D 2201/0415; B01D 2201/291; B01D 2201/305; B01D 2201/316; F01M 11/03
See application file for complete search history.

(56) References Cited

U.S. PATENT DOCUMENTS

2012/0167534 A1* 7/2012 Munkel .............. B01D 46/0031
                                                   55/385.3
2012/0318728 A1* 12/2012 Eberle .................. B01D 35/153
                                                    210/433.1

* cited by examiner

*Primary Examiner* — Krishnan S Menon
*Assistant Examiner* — Waqaas Ali
(74) *Attorney, Agent, or Firm* — James Hasselbeck

(57) ABSTRACT

A filter for filtering liquids has a housing with an inlet for liquid to be filtered and an outlet for filtered liquid. A coaxial filter element with a filter medium having an interior is arranged in the housing such that the filter element separates the inlet from the outlet. A central tube is fastened to the housing and the filter element is arranged coaxially on the central tube. An inner support body is arranged in the interior of the filter medium in a radial direction of the filter element between a radial inner circumferential side of the filter medium and the central tube. The inner support body has support webs distributed in an axial direction and in a circumferential direction of the inner support body. The support webs support the filter medium at least radially on the central tube.

11 Claims, 2 Drawing Sheets

FILTER FOR FILTERING LIQUIDS AND FILTER ELEMENT OF SUCH A FILTER

CROSS-REFERENCE TO RELATED APPLICATIONS

This application is a continuation application of international application No. PCT/EP2013/071576 having an international filing date of 16 Oct. 2013 and designating the United States, the International Application claiming a priority date of 13 Dec. 2012, based on prior filed German patent application No. 10 2012 024 349.9, the entire contents of the aforesaid international application and the aforesaid German patent application being incorporated herein by reference.

BACKGROUND OF THE INVENTION

The invention concerns a filter for filtering liquids, in particular fuel, of an internal combustion engine, in particular of a motor vehicle, comprising a housing with at least one inlet for liquid to be filtered and at least one outlet for filtered liquid, comprising a coaxial filter element that comprises a filter medium with an interior in which at least one support body for supporting the filter medium is coaxially arranged and that is arranged in the housing in such a way that it separates the at least one inlet from the at least one outlet.

Moreover, the invention concerns a filter element of a filter for filtering liquids, in particular fuel, of an internal combustion engine, in particular of a motor vehicle, that can be arranged in a housing with at least one inlet for the liquid to be filtered and at least one outlet for filtered liquid in such a way that it separates the at least one inlet from the at least one outlet and that comprises a coaxial filter medium with an interior in which at least one support body for supporting the filter medium is coaxially arranged.

DE 35 14 778 C1 discloses a filter insert for a liquid filter. The liquid filter can serve for purifying fuels for an internal combustion engine. The filter insert is comprised of a star-shaped folded filter element that is resting with its inner circumference on a support pipe provided with cutouts. End disks of plastic material embed seal-tightly the filter element at its upper and lower end. The support pipe which is serving as a support for the filter element is divided into two parts perpendicular to the longitudinal axis. The partial members are formed as one piece together with the end disks. The filter element is not supported across its entire length by the two-part support pipe.

SUMMARY OF THE INVENTION

The invention has the object to design a filter and a filter element of the aforementioned kind in which the filter medium is stabilized better in particular against radial force actions.

This object is solved according to the invention in that the filter medium is mounted coaxially on a central tube that is fast with the housing and in that an inner support body, arranged between the radial inner circumferential side of the filter medium and the central tube, comprises a plurality of support webs which are distributed in axial direction and in circumferential direction across the inner support body and which serve for supporting the filter medium at least radially on the central tube.

According to the invention, the inner support body serves for bridging gaps between the radial inner circumferential side of the filter medium and the exterior side of the central tube. The filter medium is supported directly on the inner support body. In case that at the radial inner circumferential side of the filter medium a further body, in particular a support pipe and/or a further filter layer, in particular a coalescing layer, is arranged, the filter medium can also be supported indirectly by means of this body on the inner support body.

The central tube can advantageously be fastened stably in particular in a filter cup of the housing. The central tube can be designed as a component lasting a life time.

The inner support body prevents that the filter medium collapses in radial inward direction. Accordingly, even great radial forces that are acting on the filter medium can be transmitted by the support body onto the central tube. The filter medium is stabilized along its entire extension. The filter medium remains stable with regard to its shape even when high pressures occur. Accordingly, the filter medium can also be used in filters, in particular in fuel filters, that do not have a bypass valve and therefore may be exposed to a maximum pressure generated within the liquid system. By using the support webs, the inner support body can be arranged in a space-saving way even within tight mounting spaces. The inner support body can advantageously be realized as a separate component. In this way, the filter element and the housing can be assembled of modules. Depending on the diameter of the central tube and inner cross-section of the filter medium, an appropriate inner support body can be selected that, in this way, may also function like an adapter. The inner support body can also be connected fixedly with the filter element so that it is a component of the filter element.

In an advantageous embodiment, at least one of the support webs can extend in axial direction. Advantageously, the at least one support web can extend in axial direction across the entire length extension of the filter medium. In this way, a support of the filter medium uniformly along its entire axial extension is possible. Axial webs require little mounting space. Axial support webs can be realized with a material expenditure that is minimal in relation to their surface that is effective for the support action.

In a further advantageous embodiment, radially between the inner support body and the radial inner circumferential side of the filter medium, a media support body can be arranged on which, on a radial outer side, directly or indirectly the radial inner circumferential side of the filter medium and, on a radial inner side, the support webs can be supported. Advantageously, the media support body can be a support pipe which is radially permeable for liquids. The support pipe can be a part of the filter element. It can be fixedly connected with the filter medium. In addition or as an alternative, it can be connected with appropriate end disks of the filter element.

Advantageously, the media support body can be a support pipe with stays arranged like a grid, in particular axial stays and/or circumferential stays, and the stays can be arranged such that they can abut against the support webs. A grid-like support pipe can be realized in a simple way. It is stable in axial direction as well as in circumferential direction. Grid openings between the stays realize passages which, in comparison to the liquid-impermeable areas of the stays, can be large. The pressure loss at the support pipe between the inlet side and the outlet side can thus be minimized. By means of solid stay bodies, great radial forces can be transmitted so that, together with the support webs, they can provide a good support between the radial inner circumferential side of the filter medium and the central tube. Advantageously, the circumferential and axial distribution of the stays of the support pipe and the distribution of the support webs can be matched to each other. In this way, a corresponding stay of the support pipe can rest on each support web. When the support pipe and the support webs are designed such that on each support web a corresponding stay is resting flat, the expansion of the support webs in circumferential direction and in axial direction can be optimized accordingly. In this way, material can be saved. Also, in this way, the liquid-impermeable areas covered by the stays and therefore the pressure losses between clean side and raw side of the filter element can be minimized.

Moreover, between the support webs, the inner support body may advantageously comprise a separating medium for separating water from fuel, in particular a screen-like medium. In this way, the support function can be combined with a separating function without a separate component being required. The separating medium can advantageously be a hydrophobic medium that repels water. Accordingly, water can be retained at the radial outer side of the separating medium. Only the fuel can pass through the separating medium. The retained water can sink in a precipitation gap between the separating medium and the filter medium downwardly or, should the density of the fuel be greater than that of water, can migrate upwardly. The separated water can be collected and removed from the housing. The screen-like separating medium can be realized in a simple way. Advantageously, the inner support body and the separating medium can be made of plastic material. The support webs and the separating medium can be monolithic. In this way, the manufacturing process can be simplified. The support webs can support the separating medium. The separating medium itself can thus be realized in a material-saving way and with minimal weight even with thin wall thicknesses. The separating medium can even be produced of a material that by itself is not shape-stable and that is supported by means of the support webs.

In a further advantageous embodiment, the support webs, in particular axial support webs, can extend in radial direction on both sides (on an inner side and an outer side in radial direction) of the separating medium. In this way, the support webs provide additionally the function of spacers so that between the separating medium and the filter medium, on the one hand, and the separating medium and the central tube, on the other hand, a radially and circumferentially extending gap can be delimited, respectively. In contrast thereto, circumferentially extending support webs are preferably configured to be more flat in radial direction so that they do not form a barrier for the downwardly flowing water or the upwardly flowing fuel.

In a further advantageous embodiment, a coalescing medium can be arranged radially between the inner support body, optionally the media support body, and the filter medium. The coalescing medium can serve for separating water that is contained in the fuel. At the coalescing medium, in flow direction downstream of the filter medium, even smallest water droplets which are contained in the fuel can be combined to larger water drops. In this context, the fine water droplets can be retained at the coalescing medium and grow to large drops until they are entrained by the fuel flow and carried away from the coalescing medium. The removed water drops, in flow direction downstream of the coalescing medium, can then sink downward in a gap between the coalescing medium and the central tube, or optionally the separating medium, or, inasmuch as the density of the fuel is greater than that of water, can migrate upwardly and can be collected. Preferably, the coalescing medium is designed as a coil, i.e., comprises at least one coiled layer.

Advantageously, the filter medium can be folded in a zigzag shape. With a zigzag-shaped folded filter medium an optimal ratio between separating surface and required mounting space can be realized. Advantageously, the filter element can be a round filter element which can be arranged in a space-saving way and can be mounted in a simple way.

Moreover, advantageously the housing can be openable and the filter element can be arranged exchangeably in the housing. Accordingly, the filter element can be removed from the housing for servicing purposes and/or cleaning purposes. The filter element can thus be replaced simply with a new filter element.

The technical object is furthermore solved according to the invention by the filter element in that an inner support body is designed such that the filter element can be mounted coaxially on a central tube that is fast with the housing and the inner support body comprises a plurality of support webs distributed across the inner support body for supporting the filter medium at least radially on the central tube. The advantages and features which have been explained in connection with the filter according to the invention apply correspondingly to the filter element according to the invention and its advantageous embodiments.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in the drawing, the description, and the claims in combination also expediently individually and combine them to other meaningful combinations.

In the Figures, same components are provided with same reference characters.

DESCRIPTION OF PREFERRED EMBODIMENTS

Figure 1:
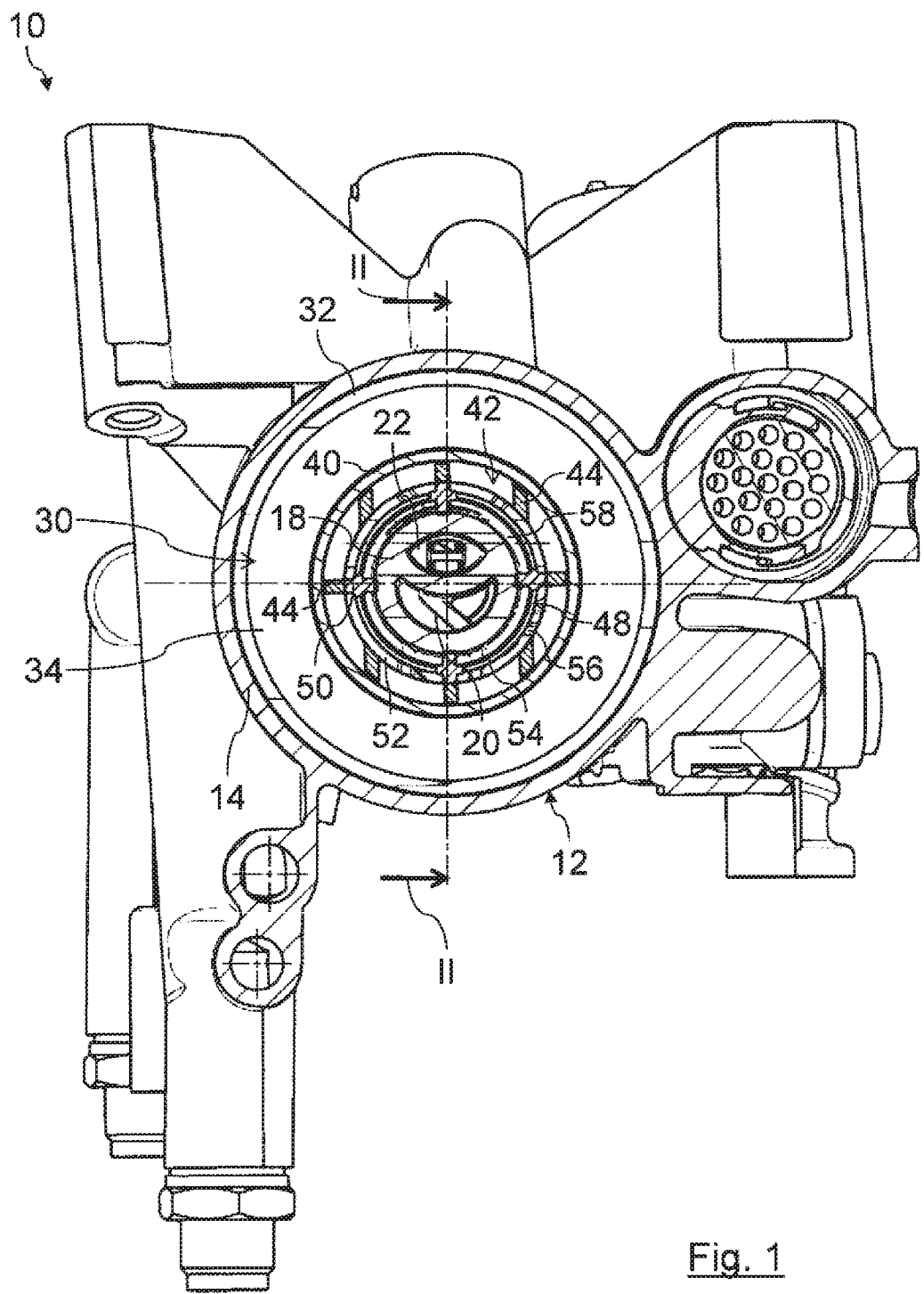
FIG. 1 shows a cross-section of a fuel filter with a filter element with a zigzag-shaped folded filter medium that is supported with an inner support pipe on a central tube of the housing.
Figure 2:
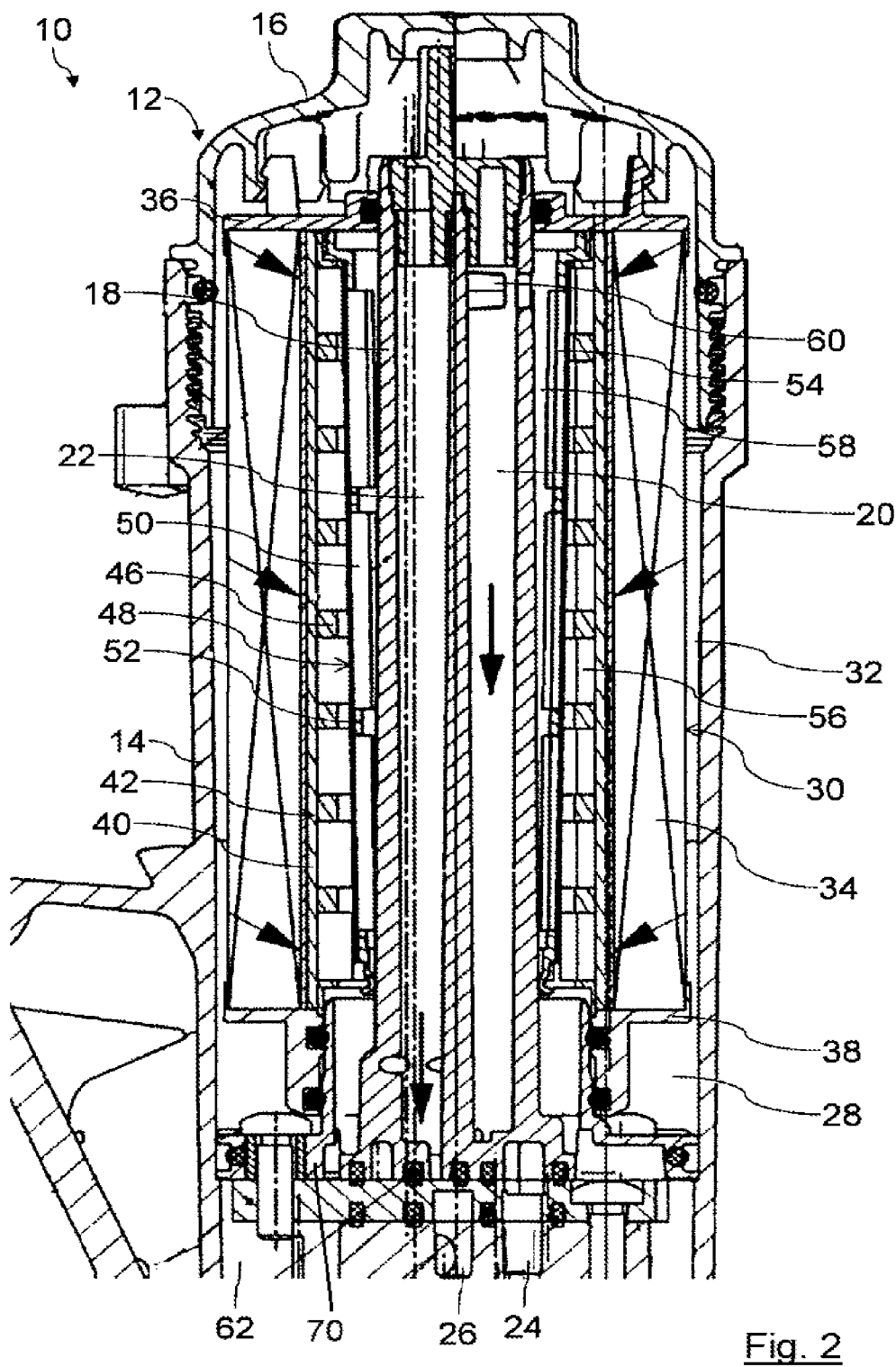
FIG. 2 is a longitudinal section of the fuel filter of FIG. 1 along the section line II-II indicated therein.

In FIG. 1, a fuel filter 10 of an internal combustion engine of a motor vehicle is illustrated in cross-section; FIG. 2 shows a longitudinal section of the fuel filter 10.

The fuel filter 10 comprises a filter housing 12 with a housing cup 14 that is substantially cylindrical in its interior and with a housing cover 16, illustrated in FIG. 2. For reasons of manufacturing technology, the interior of the housing cup 14 tapers slightly conically in downward direction. The housing cover 16 is screwed into an open side of the housing cup 14. A central tube 18 is arranged coaxially in the housing cup 14. The central tube 18 is attached by a connecting flange 70 to the bottom of the housing cup 14.

In the central tube 18 a flow channel 20 and a venting channel or return channel 22 are extending in axial direction. The flow channel 20 is open toward a connecting channel, not shown in the Figures, and the return channel 22 is open toward a return connecting channel 26 in the connecting flange. Through the flow channel 20 the filtered fuel can be supplied to the internal combustion engine by means of a connecting channel, not illustrated, that forms an outlet of the filter housing 12 for the filtered fuel. Through the return channel 22, via the return connecting channel 26, gas which collects in the upper part of the filter housing 12, in particular air, and fuel that is present in the filter housing 12 when removing the filter element 30 can be returned into the fuel tank in a way not of interest here.

An inlet channel 24 that forms an inlet of the filter housing 12 for the fuel to be filtered extends into an inlet chamber 28, shown in FIG. 2, at the bottom of the housing cup 14. The inlet channel 24, in particular by means of a fuel pump, not illustrated, is connected with a fuel tank, not illustrated, from which the fuel to be filtered can be supplied to the fuel filter 10.

In the filter housing 12, a filter element 30 is exchangeably arranged. The filter element 30 is mounted on the central tube 18 in axial direction. The filter element 30 separates the inlet from the outlet of the filter housing 12. The inlet chamber 28 is connected with an annular inlet space 32 which surrounds the filter element 30 outwardly in radial direction. The filter element 30 comprises a filter bellows of a zigzag-shaped folded filter medium 34 which, as a whole, has an approximately hollow cylindrical shape. At its end faces, the filter medium 34, as illustrated in FIG. 2, is connected seal-tightly with an upper end disk 36 and a lower end disk 38. The central tube 18 penetrates the lower end disk 38.

At its radial inner circumferential side, a circumferentially closed coalescing medium 40 that is also approximately hollow-cylindrical is resting on the filter medium 34. The coalescing medium 40 extends between the two end disks 36 and 38 and is also seal-tightly connected with them. The coalescing medium 40 serves for combining smallest water droplets contained in the fuel to be filtered to large water drops.

In the interior of the filter element 30, a grid-like media support body in the form of a media support pipe 42 is arranged. The media support pipe 42 is resting on the radial inner circumferential side of the coalescing medium 40. The media support pipe 42 supports the filter medium 34 and the coalescing medium 40. The media support pipe 42 comprises eight axial stays 44 distributed in circumferential direction and each connected with their ends with the upper end disk 36 and the lower end disk 38. In axial direction between the axial stays 44, a plurality of circumferential stays 46 which stabilize the axial stays 44 circumferentially and radially are provided at a uniform spacing so that a grid is formed.

Between the media support pipe 42 and the central tube 18 an inner support pipe 48 is coaxially arranged. The inner support pipe 48 comprises four axial support webs 50 which are distributed in circumferential direction and extend in axial direction. The axial support webs 50 are connected to each other by a plurality of circumferential support webs 52 which are distributed in axial direction. In the free areas that are delimited by the axial support webs 50 and the circumferential support webs 52, sections of a screen-like separating medium 54 are extending. The separating medium (screen) 54 is comprised of a hydrophobic material which is retaining water contained in the fuel. The separating medium 54, the axial support webs 50, and the circumferential support webs 52 are seal-tightly connected to each other. They can be made of the same material. They can be monolithically connected to each other. The radial wall thickness of the separating medium 54 is minimal in comparison to the respective radial extension of the axial support webs 50, of the circumferential support webs 52, and of the coalescing medium 40. The inner support pipe 48 as a whole is circumferentially closed.

The axial support webs 50 and the circumferential support webs 52 extend in radial direction on both sides (inner and outer sides) of the separating medium 54, respectively. Each axial support web 50 is resting flat with its radial outer side on one of the axial stays 44 of the media support pipe 42. With its radial inner side, it is resting on the radial outer circumferential side of the central tube 18. The circumferential support webs 52 are positioned with their radial outer circumferential sides at the radial inner sides of the axial stays 44. Their radial inner circumferential sides are minimally spaced from the outer circumference of the central tube 18. The axial support webs 50 and the circumferential support webs 52 support in this way the filter medium 34 and the coalescing medium 40 radially relative to the central tube 18. The inner support pipe 48 is connected at the end faces with the end disks 36 and 38.

For mounting the fuel filter 10, the filter element 30, with the housing cover 16 removed, is mounted with its lower end disk 38 leading in axial direction on the central tube 18. Subsequently, the housing cover 16 is screwed on. The removal of the filter element 30 is done in reverse direction.

Upon operation of the internal combustion engine, the fuel to be filtered is supplied through the inlet channel 24 of the fuel filter 10 to the inlet chamber 28. It passes from there into the annular inlet space 32. From the annular inlet space 32 the fuel to be filtered passes in radial direction from the exterior to the interior first through the filter medium 34 and subsequently through the coalescing medium 40. The axial support webs 50 and the circumferential support webs 52 stabilize the separating medium 54 and support it relative to the media support pipe 42 and the central tube 18. The axial support webs 50 and the circumferential support webs 52 support moreover the filter medium 34 and the coalescing medium 40 relative to the central tube 18 and prevent in this way that the filter medium 34 may collapse as a result of the pressure difference between the clean side and the raw side.

Particles are essentially filtered out of the fuel by the filter medium 34. In the coalescing medium 40, in a way not of interest here, smallest water droplets contained in the fuel are combined to larger water drops. As soon as the water drops have reached a certain size, they are entrained by the fuel flowing through and pass through the grid openings of the media support pipe 42 into a precipitation gap 56. The precipitation gap 56 has the shape of an annular space which is located between the coalescing medium 40 and the inner support pipe 48.

The fuel from which the particles have been removed passes through the separating medium 54 in a radial direction from the exterior to the interior and reaches an inner annular space 58. The inner annular space 58 is located between the separating medium 54 and the central tube 18. From the inner annular space 58 the fuel that has been filtered and from which water has been removed passes through the connecting openings 60 in the wall of the central tube 18 into the flow channel 20. From the flow channel 20 the filtered fuel flows via the discharge connecting channel 26 into the fuel line and to the internal combustion engine.

The water drops contained in the fuel are retained at the separating medium 54 and sink in the precipitation gap 56 downwardly. The precipitation gap 56 is connected at the bottom with a water collecting space 62, only partially shown, from which the collected water can be removed in a way not of interest here.

In the above-described embodiment of a fuel filter 10 and a filter element 30, inter alia the following modifications are possible.

The invention is not limited to a fuel filter 10 of an internal combustion engine. Instead, it can be used also for other types of liquid filters of an internal combustion engine, for example, oil filters. Moreover, the invention can also be utilized in areas outside of automotive technology, for example, in industrial motors.

The separating medium 54, instead of being screen-like, can also be a different type of water-repellent separating medium.

The inner support pipe 48 can also be mounted as a separate component in the filter element 30, for example, also to be separable therefrom.

The invention can also be used in filter elements without coalescing medium.

The axial support webs 50 and/or the circumferential support webs 52 can also be arranged, instead of on the interior support pipe 48, directly on an appropriately designed media support pipe. In this case, the interior support pipe 48 can be eliminated. Alternatively, the inner support pipe can additionally have the function of a media support pipe so that a separate media support pipe can be eliminated.

The inner support pipe 48 can also be designed such that only the axial support webs 50 or only the circumferential support webs 52 are supported in radial outward direction against the filter medium 34 and the coalescing medium 40 and in radial inward direction against the central tube 18.

While specific embodiments of the invention have been shown and described in detail to illustrate the inventive principles, it will be understood that the invention may be embodied otherwise without departing from such principles.

What is claimed is:

1. A filter for filtering liquids, the filter comprising:
   a housing comprising:
      at least one inlet for liquid to be filtered and
      at least one outlet for filtered liquid; and
      wherein the housing includes a central tube mounted onto a bottom wall of the housing and projecting into an interior of the housing, the central tube elongated in an axial direction and projecting axially into the interior of the housing;
      wherein a radial direction, as used herein, is a direction transverse to the axial direction; and
   a coaxial filter element received in the interior of the housing coaxially to the central tube of the housing, the filter element comprising:
      an upper end disk having a central opening;
      a lower end disk having a central opening;
      an annular filter medium which surrounds an axially extending open interior of the filter element, the annular filter medium arranged between and connected to both the upper end disk and the lower end disk;
      wherein the center tube of the housing extends through the open interior of the filter element and projects through the central opening of the upper end disk and the lower end disk;
      wherein the filter element is arranged in the housing such that the filter element separates the at least one inlet from the at least one outlet;
      a circumferentially closed coalescing medium arranged directly on a radially inner side of the annular filter medium, opposing axial ends of the circumferentially closed coalescing medium seal-tightly connected to the upper end disk and the lower end disk;
      a media support body arranged in the radial direction of the filter element on a radial inner circumferential side of the circumferentially closed coalescing medium,
      wherein the radial inner circumferential side of the circumferentially closed coalescing medium is supported directly on a radial outer side of the media support body, and
      an inner support body arranged in a radial interior of the media support body of the filter medium, wherein the inner support body comprises support webs, the support webs including axial support webs projecting radially inwardly from a radially inner side of the inner support body, the axial support webs distributed in a circumferential direction of the inner support body, the axial support webs connected at opposing axial ends to the upper end disk and the lower end disk;
      wherein the axial support webs rest directly against the media support body at the radial inner side of the media support body;
      wherein the inner support body is inserted in an axial direction onto the central tube during installation of the filter element into the housing,
      wherein a radial inner side of the axial support webs of the inner support body are arranged at a radial outer side of the central tube,
      wherein support webs of the inner support body contacts and are supported on a radial inner side of the media support body, such that the filter medium is supported on the media support body which radially contacts the inner support body, radially contacting against the support tube.

2. The filter according to claim 1, wherein the media support body comprises
   a support pipe with stays arranged to form a grid,
   wherein the stays are arranged such that the stays are supported on the support webs of the inner support body.

3. The filter according to claim 2, wherein
   the stays include axial stays.

4. The filter according to claim 3, wherein
   the stays further include circumferentially extending stays.

5. The filter according to claim 2, further comprising
   a coalescing medium arranged in the radial direction of the filter element between the media support body and the filter medium.

6. The filter according to claim 1, wherein
   the inner support body comprises a separating medium configured to separate water from fuel,
   wherein the separating medium is arranged between the support webs.

7. The filter according to claim 6, wherein
   the separating medium is a screen.

8. The filter according to claim 6, wherein
   the separating medium in the radial direction of the filter element has an inner side and an outer side and the support webs are arranged on the inner side and on the outer side of the separating medium.

9. The filter according to claim 1, further comprising
   a coalescing medium arranged in the radial direction of the filter element between the inner support body and the filter medium.

10. The filter according to claim 1, wherein
    the filter medium is folded in a zigzag shape.

11. The filter according to claim 1, wherein
the housing is configured to be opened and
wherein the filter element is exchangeably arranged in the housing.

\* \* \* \* \*